United States Patent
O'Meachair et al.

(10) Patent No.: US 9,944,198 B2
(45) Date of Patent: Apr. 17, 2018

(54) VEHICLE

(71) Applicant: BENTLEY MOTORS LIMITED, Crewe Cheshire (GB)

(72) Inventors: Deaglan O'Meachair, Cheshire (IE); Matthew Crumpton, Cheshire (GB)

(73) Assignee: Bentley Motors Limited, Cheshire (GB)

( * ) Notice: Subject to any disclaimer, the term of this patent is extended or adjusted under 35 U.S.C. 154(b) by 124 days.

(21) Appl. No.: 14/902,400

(22) PCT Filed: Jul. 16, 2014

(86) PCT No.: PCT/GB2014/052165
§ 371 (c)(1),
(2) Date: Dec. 31, 2015

(87) PCT Pub. No.: WO2015/008060
PCT Pub. Date: Jan. 22, 2015

(65) Prior Publication Data
US 2016/0243962 A1 Aug. 25, 2016

(30) Foreign Application Priority Data

Jul. 16, 2014 (GB) .................................. 1312706.3

(51) Int. Cl.
*B60L 15/10* (2006.01)
*B60T 7/22* (2006.01)
(Continued)

(52) U.S. Cl.
CPC ............ *B60L 15/10* (2013.01); *B60L 3/0015* (2013.01); *B60L 7/10* (2013.01); *B60L 7/26* (2013.01);
(Continued)

(58) Field of Classification Search
None
See application file for complete search history.

(56) References Cited

U.S. PATENT DOCUMENTS 5,927,829 A * 7/1999 Saga .......................... B60L 7/24
180/165
8,165,747 B2 * 4/2012 Ueno ...................... B60T 7/042
701/70
(Continued)

FOREIGN PATENT DOCUMENTS

DE 102010036685 2/2012
DE 102010036685 A1 * 2/2012 ................ B60L 7/26
(Continued)

OTHER PUBLICATIONS

Detzel Joerg, Machine translation of DE 102010036685 A1, Feb. 2012, espacenet.com.*
(Continued)

*Primary Examiner* — John Olszewski
*Assistant Examiner* — David P. Merlino
(74) *Attorney, Agent, or Firm* — Tarolli, Sundheim, Covell & Tummino LLP; John A. Yirga, Esq.

(57) ABSTRACT

A vehicle, such as an automobile, is provided with friction and regenerative braking systems. A sensor detects an obstacle in the vehicle's path and a brake controller, when operated by a user, automatically deploys either or both braking systems to decelerate the vehicle so that its speed corresponds to that of the obstacle when the vehicle is a predetermined distance from the obstacle. The brake controller is arranged to deploy the braking systems in order to optimize recovery of kinetic energy by the regenerative braking system. The brake controller may be operated in a standard mode, in which it deploys the braking systems to provide a retarding force on the vehicle which depends on a driver's input. The brake controller may be controlled by a
(Continued)

brake pedal. The pedal may have a position part way along its travel at which resistance to further travel temporarily increases and operation of the pedal beyond that position causes the brake controller to operate in the standard mode.

11 Claims, 4 Drawing Sheets

(51) Int. Cl.
    *B60L 7/26*         (2006.01)
    *B60T 1/10*         (2006.01)
    *B60L 3/00*         (2006.01)
    *B60L 7/10*         (2006.01)
    *B60L 15/20*       (2006.01)
    *B60W 10/08*      (2006.01)
    *B60W 30/18*      (2012.01)
    *B60W 10/184*     (2012.01)
    *B60W 30/09*      (2012.01)
    *B60K 6/52*         (2007.10)
    *B60W 50/00*      (2006.01)
    *B60K 6/22*         (2007.10)
    *B60W 10/188*     (2012.01)

(52) U.S. Cl.
    CPC ............ *B60L 15/2009* (2013.01); *B60T 1/10* (2013.01); *B60T 7/22* (2013.01); *B60W 10/08* (2013.01); *B60W 10/184* (2013.01); *B60W 30/09* (2013.01); *B60W 30/18127* (2013.01); *B60K 6/22* (2013.01); *B60K 6/52* (2013.01); *B60L 2240/12* (2013.01); *B60L 2240/80* (2013.01); *B60L 2250/26* (2013.01); *B60T 2201/022* (2013.01); *B60W 10/188* (2013.01); *B60W 2050/009* (2013.01); *B60Y 2200/91* (2013.01); *B60Y 2200/92* (2013.01); *B60Y 2300/89* (2013.01); *Y02T 10/6265* (2013.01); *Y02T 10/645* (2013.01); *Y02T 10/72* (2013.01); *Y02T 10/7275* (2013.01); *Y10S 903/947* (2013.01)

(56) References Cited

U.S. PATENT DOCUMENTS

| | | | |
|---|---|---|---|
| 2004/0099085 A1* | 5/2004 | Olofsson | B60T 7/04 74/513 |
| 2008/0100129 A1* | 5/2008 | Lubbers | B60L 7/18 701/70 |
| 2013/0090822 A1* | 4/2013 | Schwindt | B60L 15/10 701/70 |
| 2013/0124063 A1* | 5/2013 | Kawakami | B60T 7/042 701/93 |
| 2014/0076641 A1* | 3/2014 | Penev | B60L 7/10 180/2.2 |

FOREIGN PATENT DOCUMENTS

| | | | |
|---|---|---|---|
| EP | 1193106 | 4/2002 | |
| EP | 1839985 | 10/2007 | |
| GB | 2483477 | 3/2012 | |
| JP | 2010143462 | 7/2010 | |
| WO | WO 2009022968 A1 * | 2/2009 | ........... B60K 31/047 |
| WO | WO2011144378 | 11/2011 | |
| WO | WO2012/004842 | 1/2012 | |
| WO | WO2012/072464 | 6/2012 | |

OTHER PUBLICATIONS

International Search Report dated Jan. 22, 2015 (3 pages).
English Translation of JP2010143462 (2 pages).
English Translation of DE102010036685 (10 pages).
English Translation of WO2011144378 (21 pages).

* cited by examiner

VEHICLE

CROSS REFERENCES TO RELATED APPLICATIONS

The present application is a 35 U.S.C. §371 National Stage Patent Application of International PCT Application Serial No. PCT/GB2014/052165 having an International filing date of Jul. 16, 2014 and that was published on Jan. 22, 2015 under international publication number WO 2015/008060, which claims priority to Great Britain Patent Application Serial No. 1312706.3 that was filed on Jul. 16, 2013. This Application claims priority to and incorporated by reference the above applications in their entireties for all purposes.

TECHNICAL FIELD OF THE INVENTION

The present invention relates to a vehicle, particularly, but not exclusively, an automobile, with friction and regenerative braking systems.

BACKGROUND TO THE INVENTION

Automobiles with an electric propulsion system, such as those with hybrid drive system comprising an internal combustion engine, an electric traction motor and an electric battery, as well an pure electric vehicles, typically deploy regenerative braking in order to recover and store the vehicle's kinetic energy for use in propelling the vehicle. This is achieved by using an electric traction motor in reverse, as a generator, to convert rotational kinetic energy from the vehicle's road wheels to electrical energy which is stored in an electrical battery on the vehicle.

Owing to the capacity of typical electrical traction motors and other characteristics of electrical traction systems the regenerative braking systems cannot absorb energy as rapidly as it can be dissipated by a conventional friction braking system, and their ability to absorb energy can vary with operating conditions such as vehicle speed. Consequently a friction braking system is usually also provided, to supplement and provide a back up to the regenerative system, and a brake control system is provided to distribute braking effort between the friction and regenerative systems. The brake control system is usually arranged to distribute braking effort between the two braking systems to maximise energy recovery, whilst maintaining the feel of a conventional friction braking system to the driver.

In practice the amount of energy that is recovered by regenerative braking systems is limited by a driver's driving style. Heavy braking usually requires both regenerative and friction brakes to operate. Whenever the friction brakes are deployed energy is dispersed that might otherwise be recovered.

Embodiments of the present invention seek to address this problem.

SUMMARY OF THE INVENTION

According to the present invention there is provided vehicle comprising friction and regenerative braking systems, a sensor operative to detect an obstacle in the vehicle's path and a brake controller operable by a user to automatically deploy either or both braking systems in order to decelerate the vehicle so that its speed corresponds to that of the obstacle when the vehicle is a predetermined distance from the obstacle, the brake controller being arranged to deploy the braking systems in order to optimise recovery of kinetic energy by the regenerative braking system.

Providing automatic control of the braking systems helps to avoid a driver's driving style from impairing the ability of the braking system to recover energy. As the system decelerates the vehicle so that its speed corresponds to that of the obstacle, the system is useful for both slowing a vehicle to a stop and for slowing a vehicle to the speed of a slower moving vehicle in front.

To optimise energy recovery the brake controller may be operative to maximise use of the regenerative braking system, as compared to the friction braking system, when decelerating the vehicle.

The brake controller may deploy the braking systems in order to achieve a substantially linear deceleration of the vehicle. This approach tends to reduce the need to supplement regenerative braking with friction braking.

The brake controller may be arranged to determine a desired deceleration rate when a user engages the system to slow the vehicle. When the deceleration rate is below a threshold the brake controller may apply only regenerative braking. When the deceleration rate is above a threshold the brake controller may apply both regenerative and friction braking.

The brake controller may be selectively operated in a standard mode, in which it deploys the braking systems to provide a retarding force on the vehicle which depends on a user's input.

The vehicle may comprise a brake control such as a brake pedal. The control may be resiliently biased towards a release position. The control may have a position part way along its travel at which resistance to further travel temporarily increases. Initial operation of the control may cause the brake controller to automatically deploy either or both braking systems in order to decelerate the vehicle so that its speed corresponds to that of the obstacle when the vehicle is a predetermined distance from the obstacle, in order to optimise recovery of kinetic energy by the regenerative braking system. Operation of the control beyond the position at which resistance to further travel temporarily increases may cause the brake controller to operate in the standard mode.

Resistance to travel of the brake control may be increased by operation of an actuator. This enables an increase in resistance to travel to be selectively provided, so that increased resistance need only be applied when the braking system is operating in an automatic mode.

In the event that the sensor cannot detect any obstacle, the brake controller may operate in the standard mode.

The regenerative braking system may comprise an electrical motor drivingly connected to one or more road wheels of the vehicle and operative to generate electrical current when rotated by the vehicle's wheels, and an electric battery, or other storage device, operative to store electrical energy.

The vehicle may be an automobile.

DETAILED DESCRIPTION OF THE INVENTION

In order that the invention may be more clearly understood an embodiment thereof will now be described, by way of example only, with reference to the accompanying drawings, of which:

Figure 1:
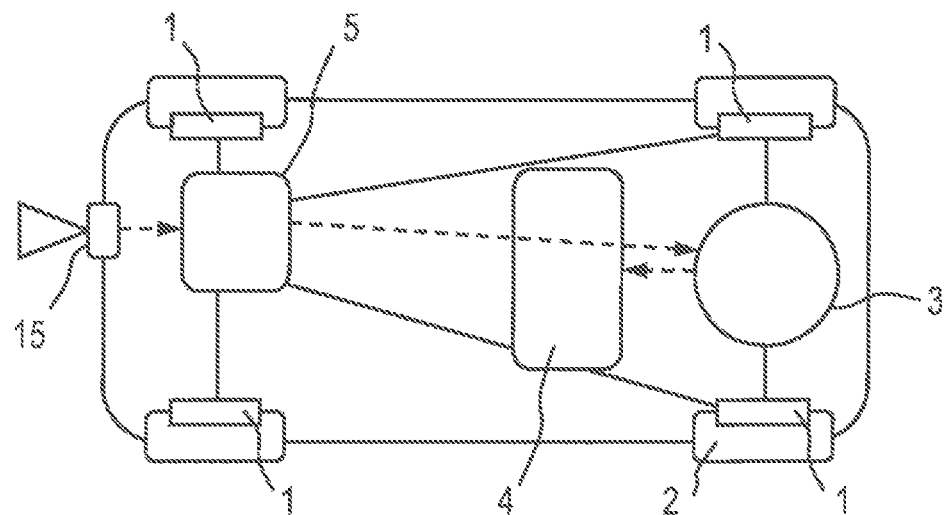
FIG. 1 is a schematic diagram of an automobile fitted with regenerative and friction braking systems and a brake control system.

Referring to the drawing, and initially figure an automobile is provided with a friction braking system. This comprises conventional hydraulically actuated disc brakes 1, one for each of the four road wheels 2 of the vehicle. The automobile is also provided with a regenerative braking system. This comprises an electric motor 3 drivingly connected to the rear wheels of the automobile. To retard the automobile the motor 3 is operated as an electrical generator to convert kinetic energy of the moving automobile to electrical energy which is stored in an electric battery 4.

The electric motor 3 may also be used to drive the automobile using energy from the battery 4 and/or from energy generated by an internal combustion engine. The automobile could thus be an electric vehicle or a hybrid vehicle.

Figure 2:
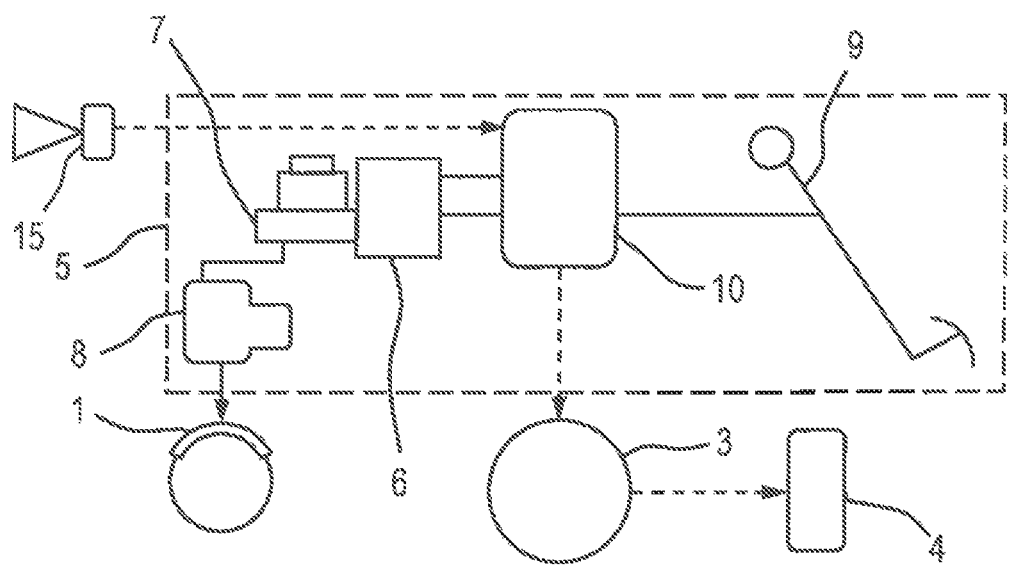
FIG. 2 is a schematic diagram showing further detail of the brake control system of FIG. 1.
Figure 3:
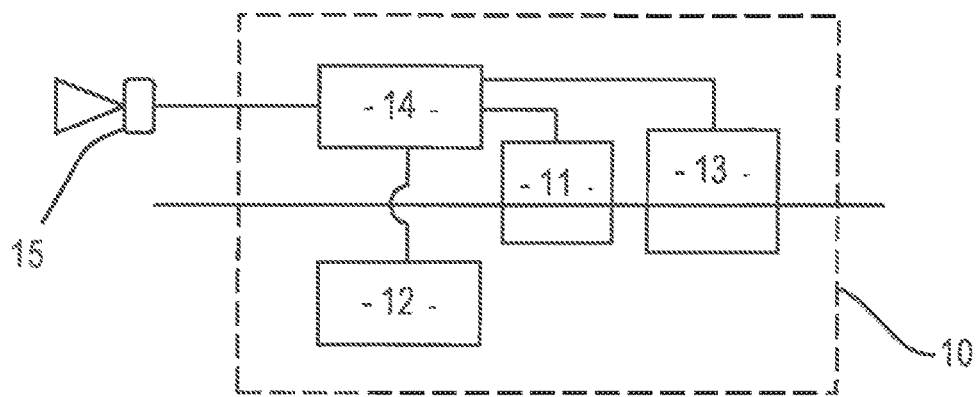
FIG. 3 is a schematic diagram showing further detail of the brake controller.

The friction and regenerative braking systems are controlled by a brake control system 5, shown in greater detail in FIG. 2.

The disc brakes 1 are actuated by a hydraulic actuation system 6 operating a master cylinder 7, with an associated fluid reservoir, which is operable to pressurise hydraulic fluid in pipes which run from the master cylinder 7 to each disc brake 1 via a stability control unit 8. The friction brakes are operated by a brake pedal 9 connected to the hydraulic actuation system 6. Progressive operation of the master cylinder causes a progressive increase in fluid pressure in the hydraulic system and thus a generally progressively increasing braking force. The stability control unit 8 may operate, depending on sensed parameters, to alter the pressure in brake fluid applied to the disc brake 1 associated with one or more of the wheels 2 in order to maintain vehicle stability, such as, for example, to prevent a wheel locking.

The brake pedal 9 is resiliently biased towards a release position, at which braking effort is applied, by a suitable resilient means such as a spring.

The regenerative braking system is actuated by a brake controller 10, also connected to the brake pedal 9. The brake controller 10 comprises a sensor 11 for determining the position of the brake pedal 9, an electrical control system 12 for causing the motor 3 to feed current to the battery 4 and thus brake the automobile, an actuator 13 for providing an additional feedback force to the drive through the brake pedal 9 by urging it towards the release position and a processor 14 operatively linked to the other components of the brake controller 10 and to the hydraulic actuation system 6. The actuator 13 is operative to selectively provide resistance to the operation of the brake pedal 9. The processor 14 is also operatively connected to a headway detector 15, such as a forward facing camera and/or radar. The headway detector 15 is operative to sense the presence of and determine the distance between the automobile, an obstacle in the automobile's path. This could be, for example, a physical obstacle such as another vehicle, either moving or stationary, or a traffic control sign such as a traffic light or a STOP sign at which the automobile is obliged to stop.

The brake controller 10 is operative, on a demand for braking signalled by the driver by depressing the brake pedal, to control application of friction (by way of the hydraulic actuation system 6) and regenerative (by way of the electrical control system 12) brakes to apply a desired retarding force to the automobile whilst optimising recover of energy to the battery. The brake control system has two, user selectable, modes of operation.

The first mode is a standard one. In this node the brake control system seeks to apply a retarding force which is dependent on the position of the brake pedal. In this mode, the brake control system seeks to provide the driver with the feel of a conventional friction braking system whilst optimising energy recovery. Thus, when the battery is not fully charged, the control system seeks to maximise use of the regenerative braking system to recover energy, but will apply the friction brakes as necessary to obtain the desired retarding force. Such a mode of operation is known for vehicles equipped with regenerative and friction brakes, and is therefore not described in further detail.

The second mode is an automatic one. In this mode, when an obstacle in the automobile's path is detected by the headway detector 15 and the driver presses on the brake pedal 9, the brake control system automatically determines the retarding force to apply dependent upon the available headway. Operation of the mode is illustrated by the flow chart in FIG. 4. First the headway detector detects an obstacle in the automobiles path and determines the distance between the automobile and the obstacle. The rate of change of the determined distance is then compared with the speed of the vehicle (as measured from its road wheels) to determine the speed of the obstacle. A desired separation between the automobile and the obstacle can then be calculated, depending on the speed of the obstacle. Where the obstacle is stationary a predetermined minimum separation is chosen. Where the obstacle is moving away from the vehicle a separation is chosen which provides a safe distance between the vehicle and the obstacle according to recognised good driving practice. The desired separation is then deducted from the distance between the vehicle and the obstacle to determine a headway for the vehicle.

A desired deceleration rate is then calculated in order to reduce the speed of the automobile to that of the obstacle over its headway, so that the speed of the vehicle is the same as that of the obstacle when the desired separation is reached, whilst optimising energy recovery. The appropriate way to optimise energy recovery will vary from vehicle to vehicle, but in general a generally linear deceleration is preferred. On application of the brakes by the driver, the brake controller selectively applies either or both of the braking systems depending upon the rate of deceleration required. If the rate of deceleration is below a threshold value only the regenerative braking system may be deployed. If it above the threshold both regenerative and friction systems may be deployed. The controller may also selectively apply either or both braking systems depending on vehicle speed. For example friction brakes only may be applied if the vehicle speed fails below a level at which the regenerative brakes become less effective.

Figure 4:
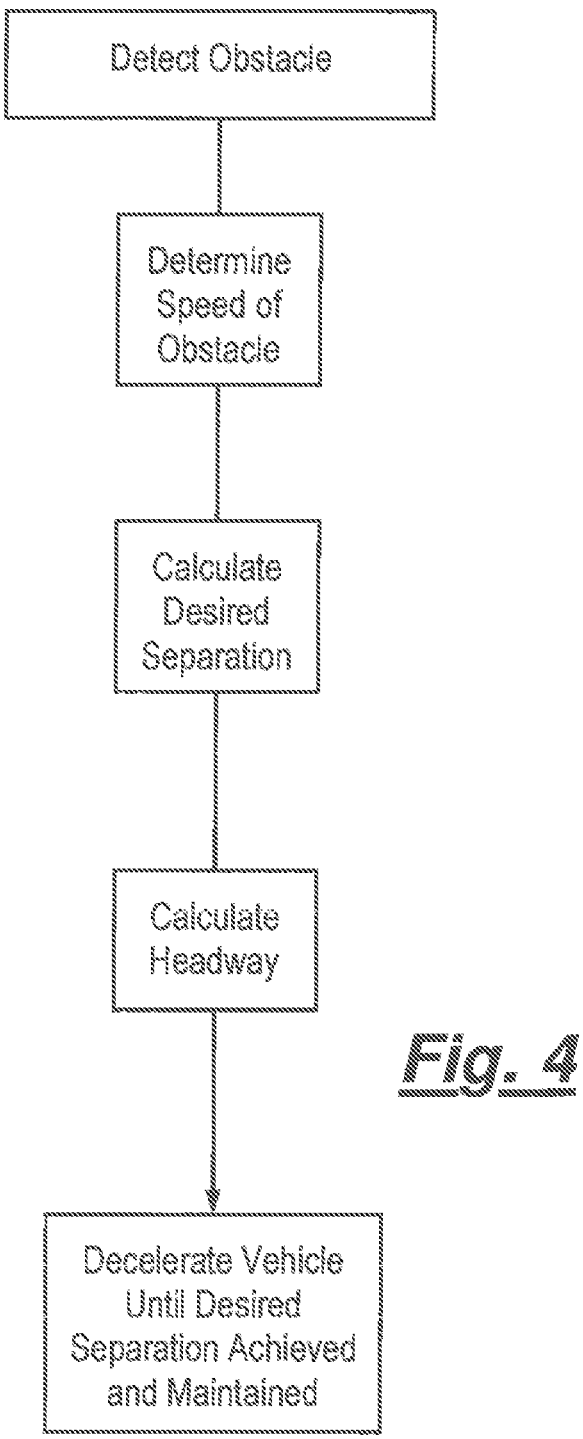
FIG. 4 is a flow chart showing an automatic brake operating mode.

As the automobile is decelerating the process illustrated in FIG. 4 is repeated and the rate of deceleration and braking effort revised as appropriate. For example, where the obstacle is a moving vehicle and that vehicle is decelerating, the rate of deceleration of the automobile may need to be increased in order to maintain a safe separation between the automobile and vehicle.

Figure 5:
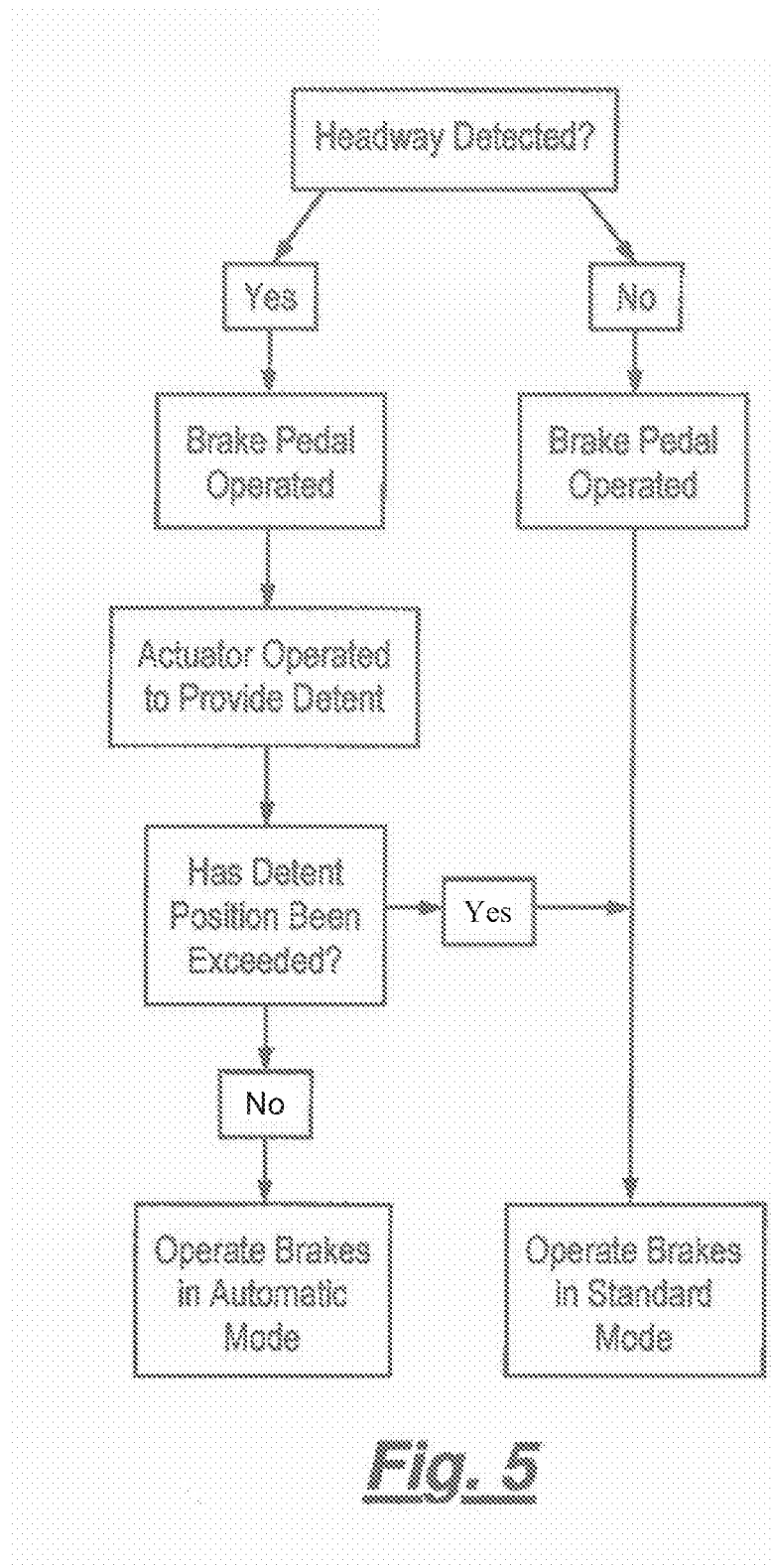
FIG. 5 is a flow chart showing how a driver selects the automatic mode.

A driver may choose whether or not to have the automatic braking mode available to use by selecting an operating mode for the vehicle. For example, a vehicle might have Normal and Eco overall operating modes, and when the Eco mode is selected the automatic braking mode is made available. When the automatic mode is made available this is achieved as shown in FIG. 5.

The headway detector continually seeks to identify an obstacle, and thus enable a headway to be calculated for the automobile. If no obstacle is detected the braking system operates in the standard mode. If an obstacle is detected, and this enables a headway and desired deceleration rate to be calculated, the automatic braking mode is made available.

On depression of the brake pedal the automatic system is activated and the brake controller 10 will apply the brakes to obtain an optimised deceleration aimed at maximising energy recovery. At the same time the actuator 13 is operated to provide resistance to depression of the brake pedal beyond a position about 20% of the way between its released position and a fully depressed position. Whilst the pedal remains in the first 20% of its travel the braking systems operates in automatic mode, and the rate of deceleration is controlled automatically irrespective of pedal position.

On depressing the brake pedal to 20% of its travel the driver will feel resistance as the decent position is approached. This signals to the driver that the braking system is operating in the automatic mode. If the driver does not depress the brake pedal beyond the point of resistance the braking system will remain in the automatic mode. If the driver depresses the brake pedal beyond the point of resistance the actuator will cease to resist depression of the pedal and the braking system will immediately revert to the standard mode and apply a retarding force dependent on pedal position. Once the system has switched to standard mode it will not revert to automatic mode until the brake pedal is fully released and reapplied and an obstacle is detected by the vehicle headway detector. The enables a driver to easily deselect the automatic mode and means that in the event of any failure of the automatic mode leading to a potential collision the driver's instinct to push harder on the brake pedal to stop the vehicle will cause the automatic mode to be disengaged.

Figure 6:
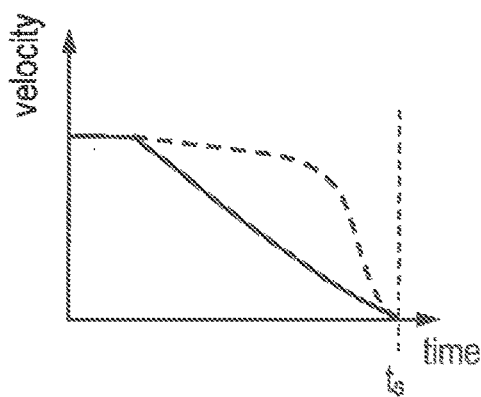
FIG. 6 is a graph showing automobile velocity against time.
Figure 7:
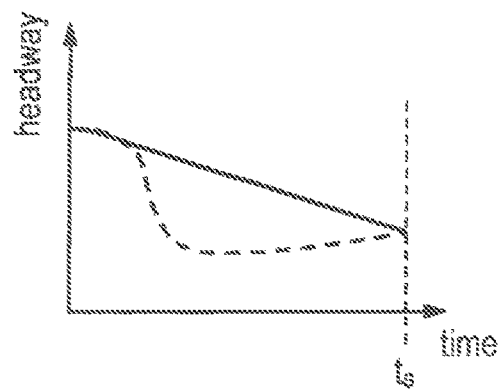
FIG. 7 is a graph showing automobile headway against time.

Provision of the automatic braking mode helps drivers to optimise energy recovery when driving a vehicle equipped with a regenerative braking system. Generally, the degree of deceleration available from a regenerative braking system is limited compared to that available from friction braking system. Under heavy braking, therefore, the friction braking system must be applied in order to achieve the desired deceleration. When the friction braking system is applied energy is dissipated as heat which might otherwise have been recovered by the regenerative system. FIGS. 6 and 7 show, in broken lines, a typical automobile deceleration path as it approaches a stationary obstacle and the corresponding reduction in available headway. As the obstacle is perceived by the driver, the driver applies the brakes gently and begins to decelerate the vehicle gradually. This helps to reassure the driver that the brakes are working and that he or she has control of the vehicle. However, the driver then driver then allows the vehicle headway to reduce significantly before increasing pressure on the brakes to decelerate the vehicle such more rapidly. In fact the headway reaches a minimum and then increases slightly as the vehicle decelerates. The more rapid deceleration typically requires application of the friction brakes and during this deceleration most of the automobile's kinetic energy is dissipated. The solid lines in FIGS. 6 and 7 show corresponding situations where the brake control system has intervened operating in automatic mode. Here, the vehicle has been decelerated substantially linearly from initial application of the brakes by the driver to a stop an appropriate distance from the obstacle. The rate of deceleration of the vehicle has therefore been substantially constant and at a rate which is much lower than during the heavier braking phase of the driver controlled example.

This lower rate of deceleration enables an increased proportion (if not all) of the braking effort to be provided by the regenerative system and therefore improves the rate of enemy recovery.

The above embodiment is described by way of example only. Many variations are possible without departing from the scope of the invention as defined in the appended claims.

The invention claimed is:

1. A vehicle comprising friction and regenerative braking systems, a sensor operative to detect an obstacle in the vehicle's path and a brake controller operable by a user in an automatic mode in which the brake controller automatically deploys at least one of the friction and regenerative braking systems in order to decelerate the vehicle so that its speed corresponds to that of the obstacle when the vehicle is a predetermined distance from the obstacle, the brake controller being arranged to deploy the braking systems in order to optimise recovery of kinetic energy by the regenerative braking system, and a user operable brake control, the control having a position part way along its travel at which resistance to further travel temporarily increases wherein initial operation of the control causes the brake controller to operate in the automatic mode and operation of the control beyond the position at which resistance to further travel temporarily increases causes the brake controller to operate in a standard mode in which it deploys the braking systems to provide a retarding force on the vehicle which depends on the user's input.

2. A vehicle as claimed in claim 1 wherein the brake controller is operative to maximize use of the regenerative braking system, as compared to the friction braking system, when decelerating the vehicle.

3. A vehicle as claimed in claim 1 wherein the brake controller deploys the braking systems in order to achieve a substantially linear deceleration of the vehicle.

4. A vehicle as claimed in claim 1 wherein the brake controller is arranged to determine a desired deceleration rate when operated by a user.

5. A vehicle as claimed in claim 4 wherein when the deceleration rate is below a threshold the brake controller applies only regenerative braking.

6. A vehicle as claimed in claim 4 wherein when the deceleration rate is above a threshold the brake controller applies both regenerative and friction braking.

7. A vehicle as claimed in claim 1, comprising an actuator operative to increase resistance to travel of the brake control.

8. A vehicle as claimed in claim 1 wherein, in the event that the sensor cannot detect any obstacle, the brake controller operates in the standard mode.

9. A vehicle as claimed in claim 1 wherein the regenerative braking system comprises an electrical motor drivingly connected to one or more road wheels of the vehicle and operative to generate electrical current when rotated by the vehicle's wheels, and a storage device operative to store electrical energy.

10. A vehicle as claimed in claim 1 wherein the vehicle is an automobile.

11. A vehicle as claimed in claim 1 wherein the brake control comprises a brake pedal.

* * * * *